(12) United States Patent
Tomita et al.

(10) Patent No.: US 7,961,271 B2
(45) Date of Patent: Jun. 14, 2011

(54) LIGHTING DEVICE AND DISPLAY DEVICE PROVIDED WITH THE SAME

(75) Inventors: Naohiro Tomita, Chiba (JP); Makoto Kurihara, Chiba (JP); Masashi Ono, Chiba (JP)

(73) Assignee: Seiko Instruments Inc. (JP)

( * ) Notice: Subject to any disclaimer, the term of this patent is extended or adjusted under 35 U.S.C. 154(b) by 566 days.

(21) Appl. No.: 12/072,628

(22) Filed: Feb. 27, 2008

(65) Prior Publication Data

US 2008/0231774 A1    Sep. 25, 2008

(30) Foreign Application Priority Data

Feb. 27, 2007  (JP) .................................. 2007-047141
Feb. 25, 2008  (JP) .................................. 2008-042594

(51) Int. Cl.
*G02F 1/1335* (2006.01)
(52) U.S. Cl. ................................ 349/65; 349/61; 349/64
(58) Field of Classification Search ............... 349/61–69
See application file for complete search history.

(56) References Cited

U.S. PATENT DOCUMENTS

| | | | |
|---|---|---|---|
| 2008/0002100 A1* | 1/2008 | Kaneko et al. | 349/65 |
| 2009/0296026 A1* | 12/2009 | Bae et al. | 349/65 |
| 2010/0182541 A1* | 7/2010 | Ouchi et al. | 349/65 |

* cited by examiner

*Primary Examiner* — Dung T. Nguyen
(74) *Attorney, Agent, or Firm* — Adams & Wilks

(57) ABSTRACT

To provide a flat lighting device used for a liquid crystal display device and the like that can be made thin and lightweight and produced at low cost, the lighting device of the present invention includes a plurality of surface light emitting plates which are two-dimensionally arranged. Each of the plurality of surface light emitting plates includes a light guide portion and a light source portion provided in an end portion of the light guide portion. The light guide portion and the light source portion are integrally provided. The light source portion of a surface light emitting plate two-dimensionally overlaps with the light guide portion of another surface light emitting plate adjacent thereto, so light having a uniform intensity can be emitted above the plurality of surface light emitting plates.

13 Claims, 4 Drawing Sheets

PRIOR ART

LIGHTING DEVICE AND DISPLAY DEVICE PROVIDED WITH THE SAME

BACKGROUND OF THE INVENTION

1. Field of the Invention

The present invention relates to a flat backlight device used to illuminate a liquid crystal display panel from the rear surface side thereof, and a liquid crystal display device provided with the flat backlight device.

2. Description of the Related Art

Liquid crystal display devices are widely used. Each of the liquid crystal display devices includes a liquid crystal display panel and a flat backlight provided on the rear surface side thereof. In recent years, along with an increase in size of the liquid crystal display panel, the flat backlight becomes larger in size. The functions required for the large-size flat backlight are, for example, high and uniform intensity over the entire light emitting surface, being thin and lightweight, and a reduced manufacturing cost. In particular, along with increases in sizes of constituent members, the scale of an assembly line becomes larger to increase a capital investment. Under such circumstances, product failure is a main cause of an increase in manufacturing cost.

FIG. 6 is a schematic cross sectional view showing a conventional liquid crystal display device 100. A backlight 107 is provided under a liquid crystal display panel 105. The backlight 107 includes an outer case 106, two light sources 101a and 101b stored in the outer case 106, two-divided light guide members 104a and 104b, a reflecting plate 102 provided about the peripheries of the light sources 101a and 101b and under the light guide members 104a and 104b, and a diffusion plate 103 for diffusing light beams emitted from the light guide members 104a and 104b in a predetermined direction. In this example, in order to realize an increase in size of the backlight, the light sources 101a and 101b are disposed on the right and left sides and a light guide member is divided into two at the center thereof. A light beam is guided to the light source 101a located on the left side by the light guide member 104a located on the left side, and a light beam is guided to the light source 101b located on the right side by the light guide member 104b located on the right side (see, for example, JP 05-158035 A).

FIG. 7 is an exploded perspective view showing a conventional known surface light source device 110. In the surface light source device 110, divided optical films are sandwiched between two diffusion plates 112 and 115. That is, the optical films are a four-divided sub selective reflection type film 113 and a four-divided sub reflection type polarizing film 114. A plurality of light sources 111 stored in a frame portion 116 are arranged under the diffusion plate 112. In this example, each of the sub selective reflection type film 113 and the sub reflection type polarizing film 114 is divided to realize an increase in size of the surface light source device 110 (see, for example, JP 2006-120584 A).

In the backlight 107 shown in FIG. 6, however, the light sources 101a and 101b are provided in side regions of the outer case 106 to introduce light beams from end portions of the light guide members 104a and 104b. Therefore, there is a problem in that the amount of light becomes insufficient as the backlight 107 increases in size. When the light guide member 104 increases in size, the light guide member 104 can be physically divided into two or more. However, a light beam is reflected in a boundary between the divided light guide members. Therefore, there is a problem in that the light beam is unlikely to be emitted at a uniform intensity. In order to prevent the light beam from being reflected in the boundary, the respective light guide members can be bonded to each other. However, when a defect such as a scratch or stain is found, the bonded light guide members need to be replaced. Therefore, there is a problem in that the advantage of the divided light guide members cannot be taken.

In the surface light source device 110 shown in FIG. 7, the plurality of light sources 111 are attached to the frame portion 116 and provided under the diffusion plate 112. A cold cathode fluorescent lamp (hereinafter referred to as CCFL) is used as such a type of light source 111 which is a large surface light emitting source. In order to increase the intensity of light emitted from the diffusion plate 115 and obtain the uniform intensity over the entire surface thereof, a large number of CCFLs are employed. Therefore, there is a problem in that the frame portion 16 storing the CCFLs becomes thicker, which leads to an increase in weight. It is necessary to produce the CCFLs according to a light emitting surface size, so there is a problem in that the common use of constituent members is difficult to be achieved.

In recent years, an area control system capable of adjusting the intensity of a light emitting source for each area is employed for a large-size liquid crystal display device in some cases. According to the area control system, the amount of light from the backlight is adjusted for each area of the backlight according to a display screen of the liquid crystal display device. In the case of the liquid crystal display device 100 shown in FIG. 6, only the intensity on each of the right and left areas can be controlled. In the case of the surface light source device shown in FIG. 7, only the intensity on an area in a longitudinal or lateral direction can be controlled. Therefore, there is a problem in that a light controllable area is small. When the CCFLs are used as light sources, it is necessary to provide an inverter circuit for each of the CCFLs to adjust light, so there is a problem in that the number of constituent parts increases, which leads to increases in weight and volume.

SUMMARY OF THE INVENTION

In view of the above, a lighting device according to the present invention includes a plurality of surface light emitting plates each including a light guide portion and a light source portion provided in an end portion of the light guide portion. The light guide portion and the light source portion are integrally provided. The plurality of surface light emitting plates are two-dimensionally arranged. The light source portion of a surface light emitting plate is provided to two-dimensionally overlap with the light guide portion of another surface light emitting plate adjacent thereto.

The light guide portion has a wedge cross section. The light source portion of each of the plurality of surface light emitting plates is provided to a thick portion of the wedge. The light guide portion of the another adjacent surface light emitting surface is provided such that a thin portion of the wedge overlaps with the light source portion of the surface light emitting plate.

In a region in which the surface light emitting plate and the another surface light emitting plate adjacent thereto two-dimensionally overlap with each other, a step portion is formed in an upper portion of the surface light emitting plate. An end portion of the adjacent another surface light emitting plate is provided on the step portion to guide light from the adjacent another surface light emitting plate to the surface light emitting plate.

A prism surface is provided as a surface of a light guide portion. The prism surface is a surface which includes a large number of V-grooves and a large number of trapezoidal grooves which are formed on the surface of the light guide portion. With respect to the V-grooves and the trapezoidal grooves, an angle formed between the surface of the light guide portion and a tilt surface of each of the V-grooves and trapezoidal grooves is set to 20° to 45° and a pitch between the V-grooves and trapezoidal grooves is set to 0.05 mm to 0.75 mm.

A display device according to the present invention includes a non-self light emission type display element and a lighting device for illuminating the non-self light emission type display element. In the lighting device, a plurality of surface light emitting plates are two-dimensionally arranged. Each of the plurality of surface light emitting plates includes a light guide portion and a light source portion provided in an end portion of the light guide portion. The light guide portion and the light source portion are integrally provided. The light source portion of a surface light emitting plate two-dimensionally overlaps with the light guide portion of another surface light emitting plate adjacent thereto.

A liquid crystal display device according to the present invention includes an image data output circuit for outputting image data to a liquid crystal display element and an illumination driver circuit for driving a lighting device. The illumination driver circuit receives the image data and controls the light source portion of each of the plurality of surface light emitting plates included in the lighting device based on the image data.

DETAILED DESCRIPTION OF THE PREFERRED EMBODIMENTS

Figure 1A:
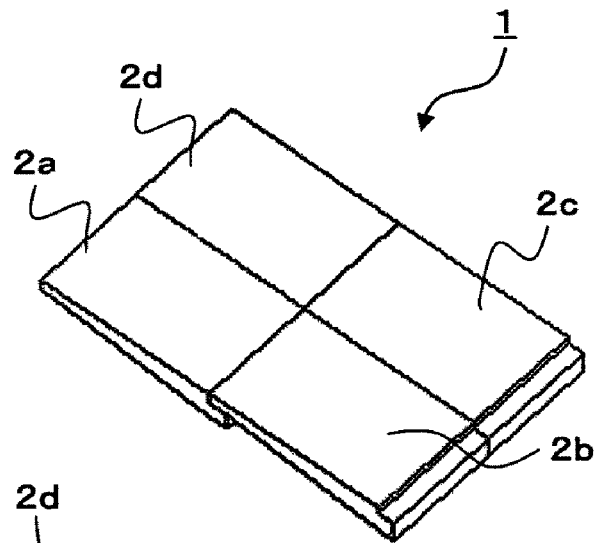
FIG. 1A is a perspective view showing a lighting device including four surface light emitting plates.

A lighting device according the present invention includes a plurality of surface light emitting plates which are two-dimensionally arranged. Each of the surface light emitting plates includes a light guide portion and a light source portion which are integrally provided. The light guide portion includes a light emitting surface for emitting light from the light source portion and a lower surface opposed to the light emitting surface. The light source portion of a first surface light emitting plate two-dimensionally overlaps with the light guide portion of a second surface light emitting plate adjacent to the first surface light emitting plate.

The light guide portion has a wedge cross section. The light guide portion of the second surface light emitting plate is provided to overlap with the light source portion of the first surface light emitting plate on an upper surface thereof.

The light emitting surface of the light guide portion includes a diffusion surface. That is, a plurality of V-grooves and a plurality of trapezoidal grooves are alternately formed on the light emitting surface. In this case, an angle formed between the light emitting surface and a tilt surface of one of the V-groove and the trapezoidal groove is set to 20° to 45°, and a pitch between the V-groove and the trapezoidal groove is set to 0.1 mm to 0.2 mm.

An angle formed between a light emitting surface of a light source provided in the light source portion and a bottom surface of the light guide portion is set to 90° to 95°.

Alternatively, a plurality of prisms are formed on a lower surface of the light guide portion to reflect light from the light source portion to the light emitting surface. A reflecting surface of each of the prisms is formed such that an incident direction of the light from the light source portion is orthogonal to a line of intersection of the reflecting surface and the lower surface of the light guide portion. An angle formed between the lower surface of the light guide portion and the reflecting surface of each of the prisms is increased as a distance from the light source portion reduces, a size of each of the prisms is reduced as the distance from the light source portion increases, or a pitch between the prisms is increased as the distance from the light source portion reduces.

A display device according to the present invention has a structure in which a non-self light emission type display element is provided on the light emitting surface side of the lighting device having any one of the structures described above. That is, the display device includes a lighting device including a plurality of surface light emitting plates which are two-dimensionally arranged and a non-self light emission type display element provided on an irradiation surface side of the lighting device. Each of the plurality of surface light emitting plates includes a light source portion and a light guide portion which are integrally provided. The light guide portion includes a light emitting surface for emitting light from the light source portion and a lower surface opposed to the light emitting surface. The light source portion of a first surface light emitting plate of the plurality of surface light emitting plates two-dimensionally overlaps with the light guide portion of a second surface light emitting plate of the plurality of surface light emitting plates, which is adjacent to the first surface light emitting plate. In this case, the light guide portion has a wedge cross section, and the light guide portion of the second surface light emitting plate is provided to overlap with the light source portion of the first surface light emitting plate on the upper surface thereof.

Hereinafter, the present invention is described in detail with reference to the attached drawings.

Embodiment 1

Figure 1B:
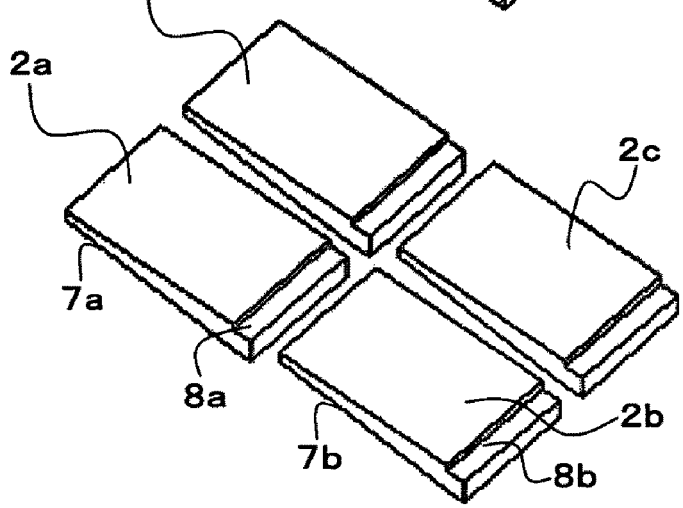
FIG. 1B is a perspective view showing a state in which the surface light emitting plates are separated from one another.
Figure 1C:
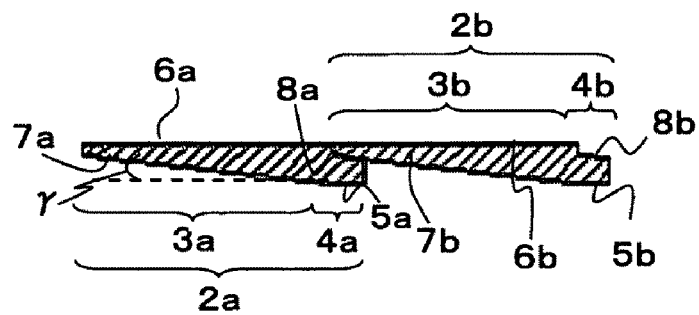
FIG. 1C is a cross sectional view showing the surface light emitting plates of the structure shown in FIG. 1A.

A lighting device according to Embodiment 1 of the present invention is described with reference to FIGS. 1A to 1C. FIG. 1A is a perspective view showing a lighting device including four surface light emitting plates. FIG. 1B is a perspective view showing a state in which the surface light emitting plates are separated from one another. FIG. 1C is a cross sectional view showing the four surface light emitting plates which are connected. As shown in FIG. 1A, a lighting device 1 includes four surface light emitting plates 2a, 2b, 2c, and 2d which are two-dimensionally arranged. As shown in FIG. 1B, the surface light emitting plates 2a to 2d can be separated from one another. The surface light emitting plates 2a to 2d fundamentally have the same shape and structure. As shown in FIG. 1C, the surface light emitting plate 2a includes a light guide portion 3a and a light source portion 4a which are integrally formed. Light emitted from the light source portion 4a passes through a region between a light emitting surface 6a and a lower surface 7a of the light guide portion 3a to be diffused to the entire surface of the light guide portion 3a. In this case, of the guided light, light emitted from the light emitting surface 6a can be used as illumination light. The same is expected in the case of the surface light emitting plate 2b.

As shown in FIG. 1C, the light guide portion 3a (3b) has a wedge shape. An angle γ formed between an extension of a light source portion bottom surface 5a of the surface light emitting plate 2a and the lower surface 7a of the light guide portion 3a is preferably 1° to 2°. This is because, when the angle γ is smaller than 1°, an interference occurs in the region where the surface light emitting plate 2a and the surface light emitting plate 2b overlap with each other. On the other hand, when the angle γ is larger than 2°, a step is formed between the light emitting surface 6a of the surface light emitting plate 2a and the light emitting surface 6b of the surface light emitting plate 2b. The surface light emitting plate 2b also has the same shape.

The light source portion 4a of the surface light emitting plate 2a overlaps with a tip end of the light guide portion 3b of the surface light emitting plate 2b. That is, a tilt surface (inclined surface) 8a of the surface light emitting plate 2a is in contact with a tip end portion of the lower surface 7b of the surface light emitting plate 2b. In this case, the tilt surface 8a and the lower surface 7b are formed such that the light emitting surface 6a of the surface light emitting plate 2a and the light emitting surface 6b of the surface light emitting plate 2b become flat while the surface light emitting plate 2a and the surface light emitting plate 2b overlap with each other. Therefore, light passing through the light guide portion 3b of the surface light emitting plate 2b can be incident on the tilt surface 8a of the surface light emitting plate 2a. As a result, the unevenness of intensity between an upper part region of the light source portion 4a of the surface light emitting plate 2a and the tip end of the light guide portion 3b of the surface light emitting plate 2b can be reduced.

A light scattering surface or a prism surface can be formed on each of the lower surfaces 7a and 7b of the light guide portions 3a and 3b. Alternatively, a light scattering plate can be provided under the light source portion bottom surfaces 5a and 5b to scatter light upward.

A small-size light emitting source such as a light emitting diode or an EL device can be used as a light source which is buried in each of the light source portions 4a and 4b or attached to each of the light guide portions 3a and 3b. A transparent synthetic resin such as a polycarbonate resin, an acrylic resin, or a Zeonoa film (registered trademark), or an inorganic material such as glass can be used as a material of the light guide portions 3a and 3b. The light guide portions 3a and 3b can be formed by injection molding of the transparent synthetic resin. An adhesive bonding member having a predetermined refractive index can be filled between the tilt surface 8a of the surface light emitting plate 2a and the light source portion bottom surface 5b of the surface light emitting plate 2b. Therefore, the reflection loss of light traveling from the light guide portion 3b to the light guide portion 3a can be reduced to suppress the unevenness in intensity which is liable to occur in a boundary region without difficulty.

As described above, when the light source portion of a surface light emitting plate and the light guide portion of a surface light emitting plate adjacent thereto are provided to overlap with each other, a lighting device free from the unevenness in intensity and a light gap can be provided. The surface light emitting plates are desirably arranged according to a size of an apparatus which requires the lighting device, so designs and manufacturing steps for members and the like can be omitted. When a part of the surface light emitting plates is scratched or contaminated and thus require to be exchanged, only the scratched or contaminated surface light emitting plate is desirably replaced. Therefore, a manufacturing yield can be improved to manufacture and repair the lighting device at low cost.

Embodiment 2

Figure 2A:
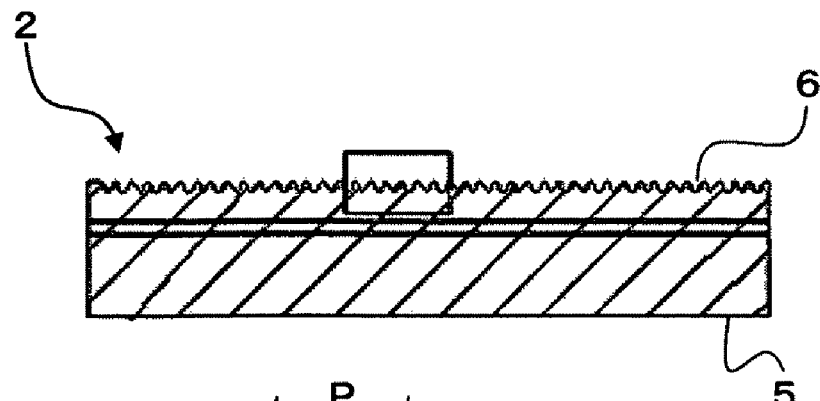
FIG. 2A is a cross sectional view showing a lighting device according to the present invention as viewed from a light incident portion side of a surface light emitting plate.
Figure 2B:
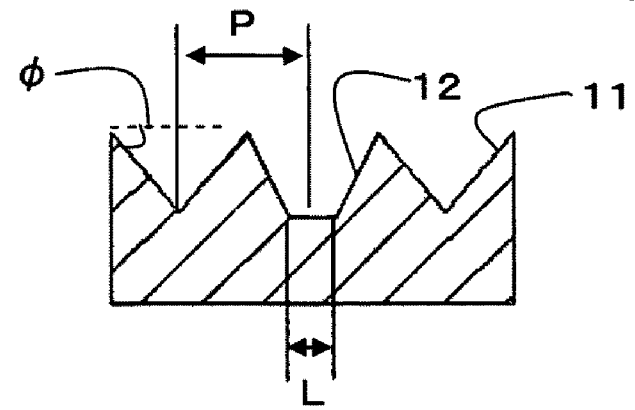
FIG. 2B is a partially enlarged view showing a light emitting surface of the surface light emitting plate.

FIGS. 2A and 2B show a lighting device according to this embodiment of the present invention. FIG. 2A is a cross sectional view seen from a light incident portion side of a surface light emitting plate, and FIG. 2B is a partially enlarged view of FIG. 2A. As shown in FIG. 2A, a light emitting surface 6 of a surface light emitting plate 2 is subjected to light scattering treatment. The light scattering treatment may be surface roughening treatment such as a sand blast, or may be realized by forming unevenness on the surface by etching or printing. A light scattering surface or a prism surface may be formed simultaneously with the formation of a light guide portion 3 using injection molding. The light scattering surface may be formed on a light source portion bottom surface 5.

FIG. 2B is a partially enlarged cross sectional view showing the light emitting surface 6 of the surface light emitting plate 2, which shows a state in which V-grooves 11 and trapezoidal grooves 12 are formed on the light emitting surface 6. The V-grooves 11 and the trapezoidal grooves 12 are alternately and continuously formed. Each of the V-grooves 11 and each of the trapezoidal grooves 12 extend in a direction parallel to the light incident direction. That is, each of the V-groove and the trapezoidal groove extends in a direction perpendicular to the surface of the sheet of FIG. 2A. In this case, a pitch P between the V-groove and the trapezoidal groove is preferably set to 100 μm to 200μm. A width L of a bottom portion of the trapezoidal groove is preferably set to 50 μm to 75 μm. An angle φ formed between a tilt surface (inclined surface) of one of the V-groove and the trapezoidal groove and a bottom side of one of the V-groove and the trapezoidal groove is preferably set to 20° to 45°. This is because, when the pitch P is equal to or smaller than 100μm, the diffusion efficiency reduces. When the pitch P exceeds 200μm, the V-groove and the trapezoidal groove can be recognized by human eyes. When the angle φ is made smaller than 20°, the scattering efficiency of light traveling upward reduces. When the angle φ is equal to or larger than 45°, a light scattering intensity difference between a region close to a light source portion 4 and a region far from the light source portion 4 becomes larger to cause unevenness in brightness.

The V-grooves can also be formed on a lower surface 7 of the light guide portion 3. In this case, a direction in which the V-grooves are formed on the lower surface 7 is orthogonal to the direction in which the V-grooves are formed on the light emitting surface 6. This is because defects such as moiré fringes are prevented from being caused by the V-grooves formed on the lower surface 7 and the light emitting surface 6. When the V-grooves are formed on both the lower surface 7 and the light emitting surface 6, the V-groove directions are desirably orthogonal to each other, and thus the light incident direction does not matter.

Embodiment 3

Figure 3:
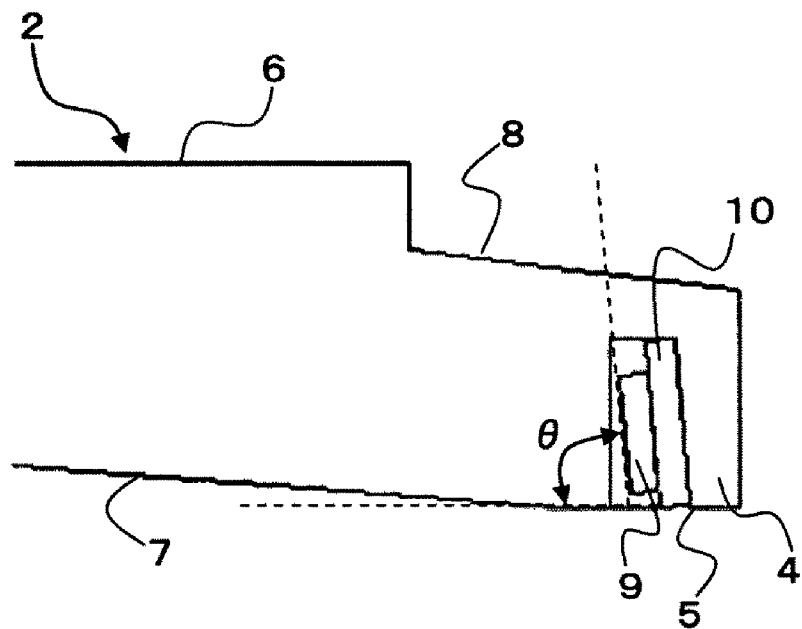
FIG. 3 is a partially enlarged view showing a schematic cross sectional structure of the lighting device according to the present invention.

FIG. 3 schematically shows a cross sectional structure of a lighting device according to Embodiment 3 of the present invention. The same parts or functions as those in the abovementioned embodiments are denoted by the same reference symbols. As shown in FIG. 3, a light source 9 of the surface light emitting plate 2 is mounted on an FPC 10 and provided at an angle in order to prevent reflecting on the light emitting surface 6 of the surface light emitting plate 2. An angle θ formed between the light source portion bottom surface 5 and a surface of the light source 9 is preferably set to 85° to 90°. This reason is as follows. When the angle θ is equal to or smaller than 85°, light exits from only a light emitting surface in a region close to a light source portion 4. When the angle θ is equal to or larger than 90°, light exits from only a light emitting surface in a region far from the light source portion 4. Therefore, unevenness in brightness occurs.

Embodiment 4

Figure 4:
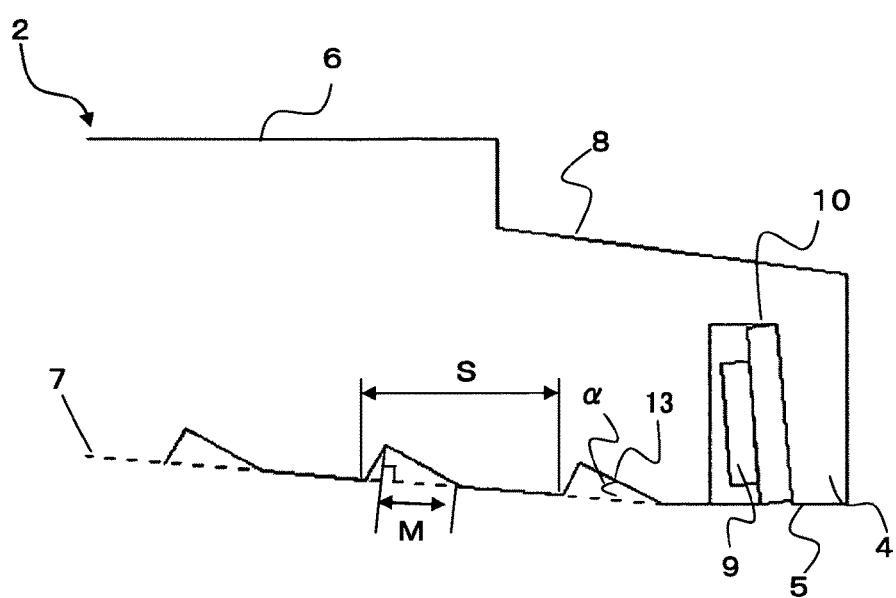
FIG. 4 is a partially enlarged view showing a schematic cross sectional structure of the lighting device according to the present invention.

FIG. 4 schematically shows a cross sectional structure of a lighting device according to Embodiment 4 of the present invention. The same parts or functions as those in the abovementioned embodiments are denoted by the same reference symbols. As shown in FIG. 4, a lower surface 7 of the surface light emitting plate 2 is subjected to light reflection treatment. The light reflection treatment is realized by forming prisms for limiting reflection directions. Each of the prisms has a reflecting surface 13 located on a light source portion side. The reflecting surface is formed in a direction perpendicular to the light incident direction. That is, the line of intersection of the reflecting surface 13 and the lower surface 7 is orthogonal to the direction of incident light projected to the lower surface 7.

An angle α formed between the lower surface 7 of the surface light emitting plate 2 and the reflecting surface 13 of each of the prisms is desirably increased as a distance between the light source 9 and each of the prisms becomes shorter. The angle α may be continuously increased or increased stepwise. To be specific, it is preferable to change the angle α such that the angle α of the prism closest to the light source is 30° and the angle α of the prism farthest from the light source is 15°. This reason is as follows. When the angle α is a constant value, an apparent angle in a region far from the light source 9 becomes larger than that in a region close to the light source 9. Therefore, a reflection direction difference increases to cause unevenness in brightness.

A pitch S between adjacent prisms is increased as a distance from the light source 9 reduces. The pitch S is reduced as the distance from the light source 9 increases. A pitch between a prism closest to the light source and a prism next closest thereto is preferably set to 3 mm. A pitch between a prism farthest to the light source and a prism next farthest thereto is preferably set to 0.2 mm. It is preferable to continuously change the pitch. This reason is as follows. When the pitch S is a constant value, the reflection direction difference between the region close to the light source 9 and the region far from the light source 9 becomes larger to cause unevenness in brightness. A size of the prism is increased as the distance from the light source 9 reduces. That is, as shown in FIG. 4, assume that a length in the case where the reflecting surface 13 of each of the prisms is projected to the lower surface 7 is a width of a bottom portion of each of the prisms. A width M of the bottom portion of each of the prisms is increased as the distance from the light source 9 reduces. The width M is reduced as the distance from the light source 9 increases. The width M of a prism close to the light source is preferably set to 0.12 mm. The width M of a prism far from the light source is preferably set to 0.09 mm. It is preferable to continuously change the width. This reason is as follows. When the width M is a constant value, a reflection intensity on the reflecting surface 13 corresponding to the region far from the light source 9 becomes larger than a reflection intensity on the reflecting surface 13 corresponding to the region close to the light source 9, thereby causing unevenness in brightness.

Embodiment 5

Figure 5:
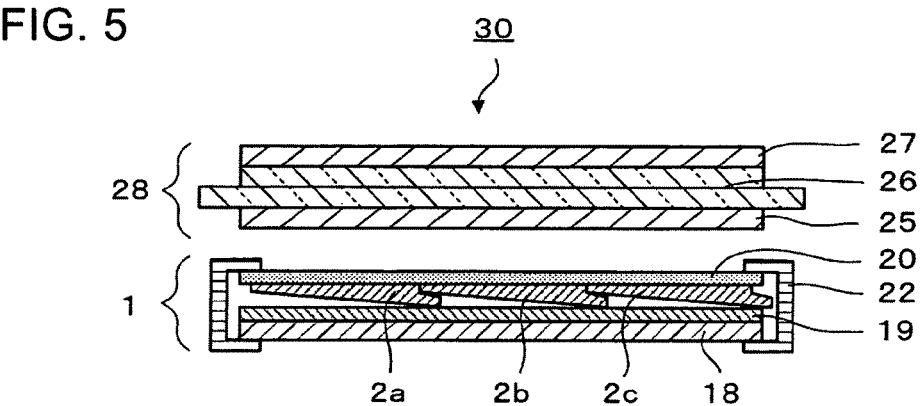
FIG. 5 is a cross sectional view showing a display device according to the present invention.
Figure 6:
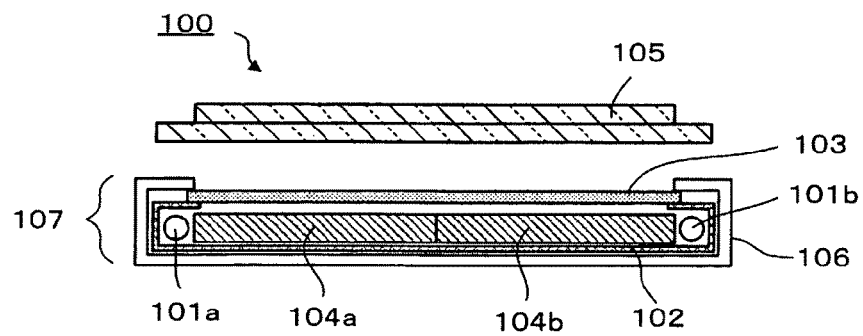
FIG. 6 is a cross sectional view showing a conventionally known liquid crystal display device.
Figure 7:
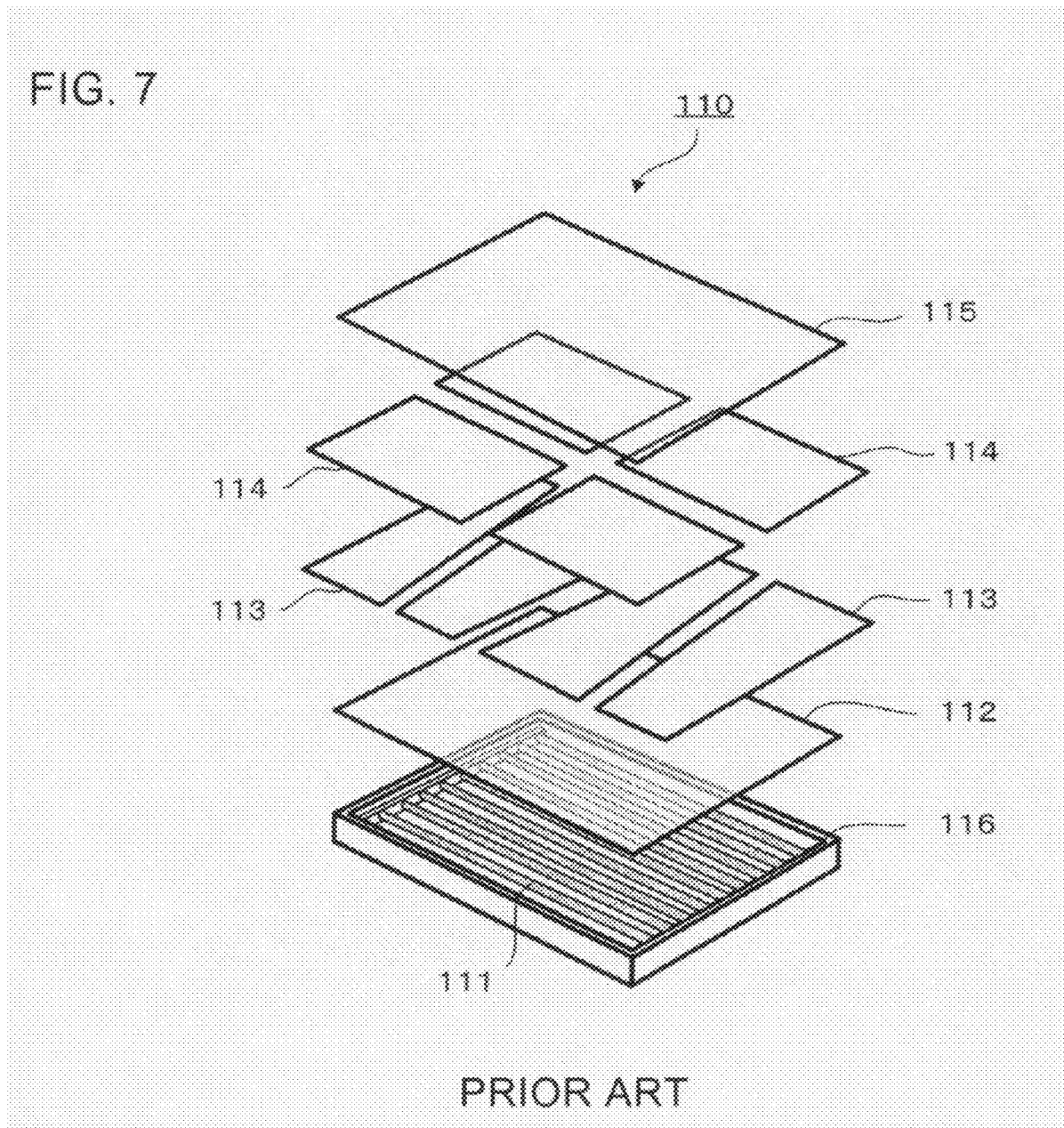
FIG. 7 is an exploded perspective view showing a conventionally known surface light emitting device.

FIG. 5 schematically shows a cross sectional structure of a liquid crystal display device according to Embodiment 5 of the present invention. The same parts or functions as those in the above-mentioned embodiments are denoted by the same reference symbols. As shown in FIG. 5, a liquid crystal display device 30 includes the lighting device 1 serving as the backlight and a liquid crystal display element 28 mounted thereon. The lighting device 1 includes the plurality of surface light emitting plates 2a to 2c, a reflecting plate 19 provided under the plurality of surface light emitting plates 2a to 2c, a frame 18 provided under the reflecting plate 19, a diffusion plate 20 provided on the plurality of surface light emitting plates 2a to 2c, and frames 22 for integrally engaging the plurality of surface light emitting plates 2a to 2c, the reflecting plate 19, the frame 18, and the diffusion plate 20. The liquid crystal display element 28 includes a polarizing plate 25, a liquid crystal panel 26, and a polarizing plate 27, and is provided on the lighting device 1.

The liquid crystal display element 28 and the lighting device 1 are driven by a display control circuit (not shown). An intensity of light from each of the surface light emitting plates 2a to 2c included in the lighting device 1 can be separately adjusted. Therefore, a liquid crystal control circuit (not shown) can analyze liquid crystal display data to adjust the intensity of light from each of the surface light emitting plates 2a to 2c to an intensity corresponding to the liquid crystal display data.

As described above, according to the present invention, the plurality of surface light emitting plates each including the light guide portion and the light source portion which are integrally provided, are two-dimensionally arranged. The light source portion of a surface light emitting plate and the light guide portion of another surface light emitting plate adjacent thereto are provided to overlap with each other. Therefore, even when one of the surface light emitting plates is defective, only the surface light emitting plate which is defective can be exchanged and thus it is unnecessary to exchange all the light guide portions, with the result that there is an advantage in that a manufacturing cost can be significantly reduced.

What is claimed is:
1. A lighting device, comprising:
a plurality of surface light emitting plates each including a light guide portion and a light source portion integral with the light guide portion, the plurality of surface light emitting plates being two-dimensionally arranged;
the light guide portion including a light emitting surface for emitting light from the light source portion and a lower surface opposed to the light emitting surface; and
the light source portion of a first surface light emitting plate of the plurality of surface light emitting plates two- dimensionally overlapping with the light guide portion of a second surface light emitting plate of the plurality of surface light emitting plates which is adjacent to the first surface light emitting plate.

2. A lighting device according to claim 1, wherein:
the light guide portion has a wedge cross section;
the light source portion has an upper surface; and
the light guide portion of the second surface light emitting plate overlaps the upper surface of the light source portion of the first surface light emitting plate.

3. A lighting device according to claim 1 or 2, wherein the light emitting surface comprises a diffusion surface for diffusing light.

4. A lighting device according to claim 3, wherein the light emitting surface has a plurality of alternating V-grooves and trapezoidal grooves.

5. A lighting device according to claim 4, wherein:
an angle formed between the light emitting surface and one of a tilt surface of each of the plurality of V-grooves and a tilt surface of each of the plurality of trapezoidal grooves is 20° to 45°; and
a pitch between the plurality of V-grooves and trapezoidal grooves is 0.1 mm to 0.2 mm.

6. A lighting device according to claim 2, wherein:
the light source portion comprises a light source including a light emitting surface;
the light guide portion further comprises a bottom surface; and
an angle formed between the light emitting surface of the light source and the bottom surface of the light guide portion is 90° to 95°.

7. A lighting device according to claim 2, wherein the light guide portion comprises prisms formed on a lower surface thereof to reflect light from the light source portion to the light emitting surface.

8. A lighting device according to claim 7, wherein each of the prisms includes a reflecting surface formed such that an incident direction of the light from the light source portion is orthogonal to a line of intersection of the reflecting surface and the lower surface of the light guide portion.

9. A lighting device according to claim 8, wherein an angle formed between the lower surface of the light guide portion and the reflecting surface of each of the prisms increases as a distance from the light source portion reduces.

10. A lighting device according to claim 8, wherein each of the prisms has a size which reduces as a distance from the light source portion increases.

11. A lighting device according to claim 8, wherein a pitch between the prisms increases as a distance from the light source portion reduces.

12. A display device, comprising:
a lighting device including a plurality of surface light emitting plates which are two-dimensionally arranged; and
a non-self light emission type display element provided on an irradiation surface side of the lighting device, wherein:
each of the plurality of surface light emitting plates includes a light source portion and a light guide portion integral with the light source portion;
the light guide portion includes a light emitting surface for emitting light from the light source portion and a lower surface opposed to the light emitting surface; and
the light source portion of a first surface light emitting plate of the plurality of surface light emitting plates two-dimensionally overlaps with the light guide portion of a second surface light emitting plate of the plurality of surface light emitting plates which is adjacent to the first surface light emitting plate.

13. A display device according to claim 12, wherein:
the light guide portion has a wedge cross section;
the light source portion has an upper surface; and
the light guide portion of the second surface light emitting plate overlaps the upper surface of the light source portion of the first surface light emitting plate.

* * * * *